US006193639B1

United States Patent
Wenzel

(10) Patent No.: US 6,193,639 B1
(45) Date of Patent: Feb. 27, 2001

(54) DEFLECTION COMPENSATION ROLL

(75) Inventor: Reinhard Wenzel, Krefeld (DE)

(73) Assignee: Voith Sulzer Papiertechnik Patent GmbH, Heidenheim (DE)

(*) Notice: Subject to any disclaimer, the term of this patent is extended or adjusted under 35 U.S.C. 154(b) by 0 days.

(21) Appl. No.: 09/371,789

(22) Filed: Aug. 10, 1999

(30) Foreign Application Priority Data

Aug. 14, 1998 (DE) ............................................. 198 36 975

(51) Int. Cl.$^7$ ...................................................... B23P 15/00
(52) U.S. Cl. .................................................. 492/16; 492/7
(58) Field of Search .................................. 492/7, 16, 20

(56) References Cited

FOREIGN PATENT DOCUMENTS

| 2919748 | 11/1980 | (DE) . |
| 3119387 | 11/1982 | (DE) . |
| 2848021 | 11/1983 | (DE) . |
| 4013772 | 5/1991 | (DE) . |
| 4217737 | 12/1993 | (DE) . |

*Primary Examiner*—I. Cuda Rosenbaum
(74) *Attorney, Agent, or Firm*—Greenblum & Bernstein, P.L.C.

(57) ABSTRACT

Deflection compensation roll with a jacket lift. The deflection compensation roll includes a carrier that is fixed against rotation, a support device coupled to the carrier, a jacket rotatably mounted on the support device, and a radial seal and an axial seal positioned between the jacket and the carrier. A ring groove is coupled to one of the jacket and the carrier, a ring body is arranged for axial movement in the ring groove. The ring body includes a face adjacent to an atmosphere outside of the jacket and a circumference. A cylindrical sealing surface is coupled to the other of the jacket and the carrier. An axial sealing lip is located on the face adjacent to the atmosphere to contact a side wall of the ring groove, and a radial sealing lip is located on the circumference to contact, and to rotate relative to, the cylindrical sealing surface.

35 Claims, 2 Drawing Sheets

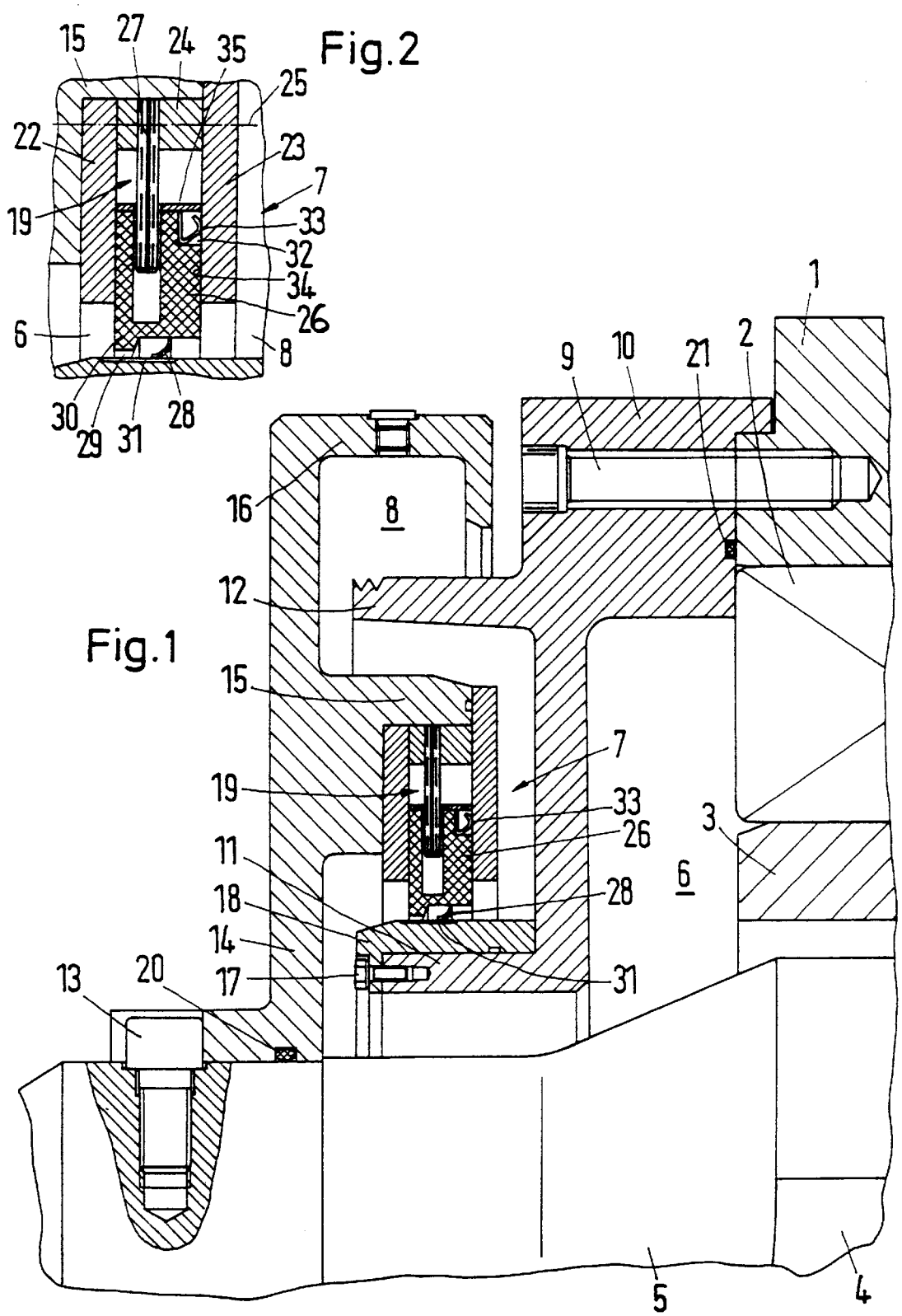

DEFLECTION COMPENSATION ROLL

CROSS-REFERENCE TO RELATED APPLICATIONS

The present application claims priority under 35 U.S.C. §119 of German Patent Application No. 198 36 975.1, filed on Aug. 14, 1998, the disclosure of which is expressly incorporated by reference herein in its entirety.

BACKGROUND OF THE INVENTION

1. Field of the Invention

The present invention relates to a deflection compensation roll having a jacket lift, whose jacket is rotationally mounted, through a hydrostatic support device, on a carrier (bracket) secured against rotation. A radial seal and an axial seal are provided at the roll ends between the jacket and the bracket.

2. Discussion of Background Information

A deflection compensation roll of the type generally discussed above is known, e.g., from DE 31 19 387 C2. The structure of the sealing arrangement is complicated because both the axial seal and the radial seal must perform their function despite considerable radial motion of the jacket caused by the jacket lift.

SUMMARY OF THE INVENTION

The present invention simplifies the sealing arrangement in a deflection compensation roll of the type described above and structures the sealing arrangement in a more compact manner.

According to the present invention, a ring body is arranged in an axially moveable manner in a ring groove that is connected to one of a jacket or a carrier (bracket). The ring body includes a face positionable adjacent to the atmosphere and a circumference, and carries, on the face positionable adjacent to the atmosphere, an axial sealing lip arranged to contact one side wall of the ring groove, and, on the circumference, a radial sealing lip arranged to contact, and rotate relative to, a cylindrical sealing surface connected to the other of the jacket or the carrier. The ring groove is designed for a lift of at least approximately 20 mm.

A very simple structure of the sealing arrangement is achieved in that the element providing the axial seal and the element provinding the radial seal are carried jointly by a ring body that is able to compensate for all radial motion between the jacket and the carrier by being displaced within the ring groove. Thus, the required space is small. The sealing arrangement is suitable for all customary sizes of deflection compensation rolls provided with a jacket lift because lifts within the ring groove of over approximately 20 mm, e.g., approximately 30 or 35 mm, can be achieved.

It may be advantageous for the ring groove to be connected to the carrier and the cylindrical sealing surface to be connected to the jacket. In this design, the ring groove and ring body are not rotatable relative to the jacket. Therefore, their associated masses do not need to be accelerated or decelerated.

In an exemplary embodiment, the radial sealing lip can be located on the outer circumference of the ring body and the ring groove can be located near the carrier. This way, the sealing arrangement can have a small diameter that has not heretofore been achieved.

In the exemplary embodiment, the side wall of the ring groove, which is adjacent to the atmosphere, may be arranged to radially extend or protrude beyond the other side wall of the ring groove and a recess for accommodating the protruding section may be provided next to the cylindrical sealing surface. Because the forces exerted on the ring body due to a pressure present in the interior of the jacket can be absorbed properly, the present invention results in the greatest possible support of the ring body on the side wall of the ring groove adjacent to the atmosphere.

The ring groove can be formed by two disk plates and a spacer ring that is arranged between them. Such an arrangement is functionally secure and can also be used for ring grooves with large diameters. The three-part construction of the ring groove also allows for simple insertion of the ring body into the ring groove.

Further, the ring body may be secured against rotation relative to the ring groove by a torque converter bearing. Such a torque converter bearing can be formed, e.g., by a radial pin placed in a bore in the ring body and in a bore in the base of the ring groove.

It may be further advantageous for the ring body to be reinforced by a metal ring. Since the ring body is stiff, it can follow every radial movement made by the jacket relative to the carrier.

Particularly, the metal ring can be formed by a steel band positioned adjacently to the circumference of the ring body that is free of the radial sealing lip. On this circumference, the largest possible working surface between the steel band and the ring body results. As a rule, no additional devices of attachment are necessary.

It may also be advantageous for the ring body to carry a support flange arranged next to the radial sealing lip. The support flange may be provided with openings, and can give the ring body a defined position relative to the cylindrical sealing surface, which can result in a defined deformation of the radial sealing lip.

In an advantageous embodiment, at least one sealing lip may be formed as one piece with the ring body. This may be especially true when the ring body is made of, e.g., plastic, such as polytetrafluoroethylene.

Accordingly, the present invention relates to a deflection compensation roll with a jacket lift. The deflection compensation roll includes a carrier that is fixed against rotation, a support device coupled to the carrier, a jacket rotatably mounted on the support device, and a radial seal and an axial seal positioned between the jacket and the carrier. A ring groove is coupled to one of the jacket and the carrier, a ring body is arranged for axial movement in the ring groove. The ring body includes a face adjacent to an atmosphere outside of the jacket and a circumference. A cylindrical sealing surface is coupled to the other of the jacket and the carrier. An axial sealing lip is located on the face adjacent to the atmosphere to contact a side wall of the ring groove, and a radial sealing lip is located on the circumference to contact, and to rotate relative to, the cylindrical sealing surface.

In accordance with a feature of the present invention, the ring groove may be adapted to accommodate a jacket lift of at least 20 mm.

According to another feature of the present invention, the ring groove can be coupled to the carrier and the cylindrical sealing surface is coupled to the jacket.

According to still another feature of the present invention, the circumference can include an outer circumferential surface, the radial sealing lip may be located on the outer circumferential surface, and the ring groove may be located near the carrier.

In accordance with a further feature of the present invention, the side wall of the ring groove in contact with the axial sealing lip may have a portion extending radially past an opposing side wall of the ring groove. The deflection compensation roll further can include a recess located next to the cylindrical sealing surface, which is adapted for accommodating the extending portion of the side wall.

In accordance with a still further feature of the instant invention, the ring groove can include two disk plates and a spacer ring may be positioned between the two disk plates.

According to still another feature of the instant invention, a torque converter bearing may be provided, and the ring body can be secured against rotation relative to the ring groove by the torque converter bearing.

According to another feature of the present invention, the ring body can include a reinforcing metal ring. The metal ring may include a steel band positioned adjacently to a circumferential surface of the circumference not in contact with the radial sealing lip.

In accordance with a further feature of the invention, a support flange can be coupled to the ring body. The support flange includes openings that may be arranged next to the radial sealing lip.

In accordance with yet another feature of the present invention, at least one of the axial sealing lip and the radial sealing lip may be formed as one piece with the ring body.

The present invention also relates to an apparatus that includes a non-rotatable carrier, a rotatable jacket arranged to rotate around the non-rotating carrier, and a sealing device arranged between the non-rotating carrier and the rotating jacket to separate an inner atmosphere of the apparatus from an outer atmosphere of the apparatus. The sealing device includes a ring groove having a side wall arranged adjacently to the outside atmosphere of the apparatus and a ring body, positioned within the ring groove, has a circumferential surface. An axial sealing lip is coupled to a surface of the ring body that is located adjacent to the side wall, and a radial sealing lip is coupled to the circumferential surface of the ring body.

According to a feature of the present invention, a carrier flange can be coupled to the carrier, a jacket flange can be coupled to the jacket, and the ring groove can be formed within one of the carrier flange and the jacket flange. The radial sealing lip may be arranged to contact the other of the carrier flange and the jacket flange. The ring groove can be formed within the carrier flange and the radial sealing lip can be arranged to contact the jacket flange.

According to another feature of the present invention, a jacket lift can be provided. The jacket lift can include at least one guide surface coupled to the carrier and a displaceable guide element coupled to move along the at least one guide surface in radial direction.

In accordance with still another feature of the present invention, a jacket flange may be coupled to the jacket, the axial sealing lip can be arranged to contact the side wall, and the radial sealing lip can be arranged in contact with the jacket flange.

In accordance with a further feature of the invention, the sealing device can also include a spacer ring arranged within the ring groove. Further, the apparatus can include a torque converter bearing arranged to secure the ring body against rotation relative to the ring groove.

According to a still further feature of the instant invention, the ring groove can include two disk plates.

According to another feature of the invention, a jacket flange may be coupled to the jacket. The jacket flange can include a cylindrical sealing surface, and the radial sealing lip may be arranged to contact the cylindrical sealing surface. The cylindrical sealing surface can include a wear protection coating.

In accordance with a further feature of invention, the ring body can include a second circumferential surface arranged opposite the circumferential surface, and a reinforcing metal band may be arranged along the second circumferential surface.

According to yet another feature of the present invention, the axial sealing lip and the radial sealing lip can be loaded with at least one of liquid pressure and spring pressure.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 illustrates partial sectional view of an end of a deflection compensation roll according to the present invention;

FIG. 2 illustrates an enlarged view of the sealing arrangement depicted in FIG. 1.

DETAILED DESCRIPTION OF THE PRESENT INVENTION

Figure 3:
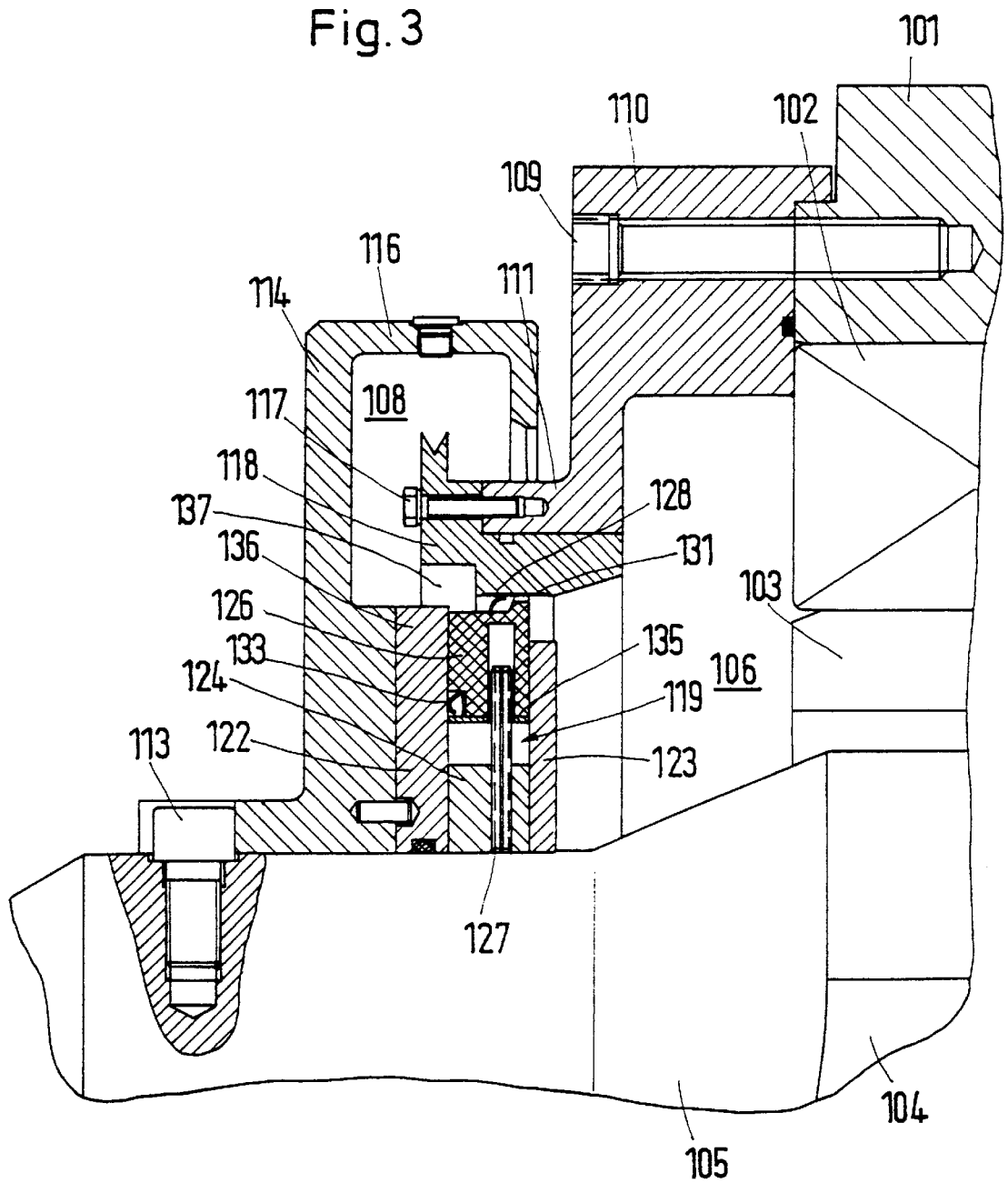
FIG. 3 illustrates an alternative embodiment to that depicted in FIG. 1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In a deflection compensation (adjustment) roll, as illustrated in FIGS. 1 and 2, a roll jacket 1 is mounted, through a bearing 2, e.g., an anti-friction bearing, on a guide element 3. Guide element 3 can be radially displaced on parallel guide surfaces 4 of a non-rotationally mounted carrier (bracket) 5. In this manner, guide element 3 can effect a "jacket lift" of roll jacket 1. While not shown in the drawings, support elements, e.g., hydrostatic support element and/or other deflection compensation elements, can be provided along the axial length of roll jacket 1, so as to load jacket 1 and to provide it with a desired deflection.

Therefore, a hydraulic liquid, e.g., oil, which is under a certain pressure that is generally only slightly above atmospheric pressure, is located in the interior 6, i.e., in the area inside the jacket 1 and in the areas adjacent to the outside. A sealing arrangement 7 ensures that no pressurized fluid escapes from interior 6 to the atmosphere 8, i.e., outside of the deflection compensation roll. For this purpose, a covering 10 having an inner cylinder ring 11 and an outer cylinder ring 12 is attached to jacket 1 by screws 9. With the aid of screws 13, a flange 14 having an inner cylinder ring 15 and an outer cylinder ring 16 is attached to carrier 5. On inner cylinder ring 11 of covering 10, an inner support ring 18 is attached to inner cylinder 11 by screws 17. A ring groove 19 is mounted on inner cylinder ring 15 of flange 14. The construction of sealing arrangement 7 is explained in greater detail below with regard to FIG. 2. Besides sealing arrangement 7, other elastic sealing rings may be provided as fixed seals, e.g., as shown by sealing rings 20 and 21.

Ring groove 19 of the sealing arrangement 7 is formed by two disk plates 22 and 23 as well as a spacer ring 24, which are attached to the inner cylinder ring 15 by an indicated screw 25. In ring groove 19, a ring body 26 is arranged to be radially moveable and is secured against rotation by a torque converter bearing 27. Torque converter bearing 27 can be, e.g., in the form of at least one radial pin arranged to engage corresponding bore(s) formed in ring body 26 and in spacer ring 24. Ring body 26 carries a radial sealing lip 28 on its inner circumference and, superposed on the inner circumference, a support flange 30 is provided with openings 29. Radial sealing lip 28 is positioned adjacent to a cylindrical sealing surface 31 that carries or is formed with a wear protection coating. In a recess 32 of ring body 26, an axial sealing lip 33 is arranged to contact a face 34 of disk plate 23, which is located adjacent to the atmosphere 8. Lips 28 and 33 can be formed, e.g., as one piece with ring body 26, which is made of, e.g., plastic, such as polytetrafluoroethylene. Additionally, lips 28 and 33 can be pressed against the opposing surface by, e.g., a liquid pressure, and/or can be loaded, e.g., by a spring. On the outer circumference of ring body 26 a metal ring 35 is located in the form of a steel band ring, which reinforces ring body 26.

During assembly, covering 10 is first attached to jacket 1 and then inner support ring 18 is attached to covering 10. Then, in a preassembly, disk plate 22, spacer ring 24, and, after ring body 26 has been inserted, disk plate 23 are fastened to inner cylinder ring 15. Then flange 14 is moved into position such that radial sealing lip 28 comes into contact with cylindrical sealing surface 31.

In operation, the position of ring body 26 and cylindrical sealing surface 31 is maintained, even when jacket 1 is displaced radially relative to carrier 5. This is because this movement causes only a radial displacement of ring body 26.

In the embodiment according to FIG. 3, the reference numbers for corresponding parts have been increased by 100. In this embodiment, ring groove 119 is near carrier 105. It is sufficient for covering 110 to have a single cylinder ring 111. In this regard, the radial extension is very small. Moreover, disk plate 122 and its component 136 extend radially over disk plate 123. Therefore, ring body 126 is supported along its entire length by the side wall of ring groove 119, which is adjacent to the atmosphere. To compensate, besides cylindrical sealing surface 131, cylinder ring 118 also has a recess 137, into which extending component 136 can insert itself.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A deflection compensation roll with a jacket lift, comprising:
    a carrier which is fixed against rotation;
    a support device coupled to said carrier;
    a jacket rotatably mounted on said support device;
    a radial seal and an axial seal being positioned between said jacket and said carrier;
    a ring groove being coupled to one of said jacket and said carrier;
    a ring body arranged for radial movement in said ring groove, said ring body comprising a face adjacent to an atmosphere outside of the jacket and a circumference;
    a cylindrical sealing surface adapted to engage the circumference of the ring body coupled to the other of said jacket and said carrier;
    an axial sealing lip located on the face of the ring body adjacent to the atmosphere, the axial sealing lip being arranged to move with the ring body and to contact a side wall of the ring groove; and
    a radial sealing lip located on the circumference of the ring body,
    wherein the radial sealing lip rotates relative to the cylindrical sealing surface.

2. The deflection compensation roll of claim 1, wherein said ring groove is adapted to accommodate a jacket lift of at least 20 mm.

3. The deflection compensation roll of claim 1, said ring groove being coupled to said carrier and said cylindrical sealing surface being coupled to said jacket.

4. The deflection compensation roll of claim 1, said circumference being an outer circumferential surface;
    said radial sealing lip being located on said outer circumferential surface; and
    said ring groove being located near said carrier.

5. The deflection compensation roll of claim 1, said side wall of the ring groove in contact with said axial sealing lip having a portion extending radially past an opposing side wall of said ring groove; and
    further comprising a recess located next to said cylindrical sealing surface, which is adapted for accommodating said extending portion of said side wall.

6. The deflection compensation roll of claim 1, said ring groove comprising two disk plates and a spacer ring positioned between the two disk plates.

7. The deflection compensation roll of claim 1, further comprising a torque converter bearing; and
    said ring body being secured against rotation relative to said ring groove by the torque converter bearing.

8. The deflection compensation roll of claim 1, said ring body comprising a reinforcing metal ring.

9. The deflection compensation roll of claim 8, said metal ring comprising a steel band positioned adjacent to a circumferential surface of said circumference not in contact with said radial sealing lip.

10. The deflection compensation roll of claim 1, further comprising a support flange coupled to said ring body, the support flange including openings arranged next to said radial sealing lip.

11. The deflection compensation roll of claim 1, at least one of said axial sealing lip and said radial sealing lip being formed as one piece with said ring body.

12. An apparatus comprising:
a non-rotating carrier;
a rotatable jacket arranged to rotate around said non-rotating carrier;
a sealing device arranged between said non-rotating carrier and said rotating jacket to separate an inner atmosphere of the apparatus from an outer atmosphere of the apparatus;
said sealing device comprising a ring groove having a side wall arranged adjacent to the outside atmosphere of the apparatus and a radially movable ring body, positioned within said ring groove, having a circumferential surface;
an axial sealing lip coupled to an axial surface of said ring body that is located adjacent to said side wall, the axial sealing lip being arranged to move with said ring body; and
a radial sealing lip coupled to said circumferential surface of said ring body.

13. The apparatus of claim 12, further comprising:
a carrier flange coupled to said carrier;
a jacket flange coupled to said jacket;
said ring groove being formed within one of said carrier flange and said jacket flange; and
said radial sealing lip being arranged to contact the other of said carrier flange and said jacket flange.

14. The apparatus of claim 13, said ring groove being formed within said carrier flange and said radial sealing lip being arranged to contact said jacket flange.

15. The apparatus of claim 12, further comprising a jacket lift.

16. The apparatus of claim 15, said jacket lift comprising at least one guide surface coupled to said carrier and a displaceable guide element coupled to move along said at least one guide surface in radial direction.

17. The apparatus of claim 12, further comprising a jacket flange coupled to said jacket;
said axial sealing lip being arranged to contact said side wall; and
said radial sealing lip being arranged in contact with said jacket flange.

18. The apparatus of claim 12, said sealing device further comprising a spacer ring arranged within said ring groove.

19. The apparatus of claim 18, further comprising a torque converter bearing arranged to secure said ring body against rotation relative to said ring groove.

20. The apparatus of claim 12, said ring groove comprising two disk plates.

21. The apparatus of claim 12, further comprising a jacket flange coupled to said jacket;
said jacket flange including a cylindrical sealing surface; and
said radial sealing lip being arranged to contact said cylindrical sealing surface.

22. The apparatus of claim 21, said cylindrical sealing surface comprising a wear protection coating.

23. The apparatus of claim 12, said ring body further comprising a second circumferential surface arranged opposite said circumferential surface; and
a reinforcing metal band arranged along said second circumferential surface.

24. The apparatus of claim 12, wherein said axial sealing lip and said radial sealing lip are loaded with at least one of liquid pressure and spring pressure.

25. A deflection compensation roll with a jacket lift, comprising:
a carrier;
a support device coupled to the carrier;
a jacket rotatably mounted on the support device;
at least one radial seal and at least one axial seal being positioned between the jacket and the carrier;
a ring groove comprising at least one side wall and being coupled to one of the jacket and the carrier;
a ring body arranged for radial movement in the ring groove, the ring body comprising at least one axial face and a circumference;
the circumference of the ring body comprising one of an inside circumference and an outside circumference;
the ring body being secured against rotation relative to the ring groove;
a cylindrical sealing surface adapted to engage the circumference of the ring body coupled to the other of the jacket and the carrier;
an axial sealing lip disposed between the axial face and the at least one side wall of the ring groove; and
a radial sealing lip located on the circumference of the ring body,
wherein the radial sealing lip rotates relative to the cylindrical sealing surface.

26. The deflection compensation roll of claim 25, wherein the axial sealing lip is arranged to move with the ring body.

27. The deflection compensation roll of claim 25, wherein the radial sealing lip is arranged to move with the ring body.

28. The deflection compensation roll of claim 25, wherein the ring body being secured against rotation relative to the ring groove via at least one radially arranged pin.

29. The deflection compensation roll of claim 25, wherein said ring groove is adapted to accommodate a jacket lift of at least 20 mm, wherein the ring groove is coupled to the carrier, and wherein the cylindrical sealing surface is coupled to the jacket.

30. The deflection compensation roll of claim 25, wherein the circumference comprises the outside diameter circumferential, wherein the radial sealing lip is located on the outer circumferential, and wherein the ring groove is located near the carrier.

31. The deflection compensation roll of claim 25, wherein the ring groove comprises two disk plates and a spacer ring positioned between the two disk plates.

32. The deflection compensation roll of claim 25, further comprising a torque converter bearing for securing the ring body against rotation relative to the ring groove.

33. The deflection compensation roll of claim 25, wherein the ring body comprises a reinforcing metal ring for reinforcing a circumference of the ring body not in contact with the radial sealing lip.

34. The deflection compensation roll of claim 25, further comprising a circumferential support flange coupled to the ring body, the support flange including openings arranged near the radial sealing lip.

35. The deflection compensation roll of claim 25, wherein at least one of the axial sealing lip and the radial sealing lip is formed as one piece with the ring body.

* * * * *